Aug. 17, 1954 C. J. YOUNG 2,686,706

FACSIMILE RECORDER

Filed May 29, 1950 7 Sheets-Sheet 1

INVENTOR
Charles J. Young
BY
George J. Craig
ATTORNEY

Aug. 17, 1954

C. J. YOUNG

FACSIMILE RECORDER 2,686,706

Filed May 29, 1950

7 Sheets-Sheet 2

INVENTOR
Charles J. Young
BY
George T. Craig
ATTORNEY

FACSIMILE RECORDER

Filed May 29, 1950

INVENTOR
Charles J. Young
BY
George J. Craig
ATTORNEY

INVENTOR
Charles J. Young
BY
George T. Craig
ATTORNEY

Aug. 17, 1954 C. J. YOUNG 2,686,706

FACSIMILE RECORDER

Filed May 29, 1950 7 Sheets-Sheet 5

INVENTOR
Charles J. Young
BY
George J. Craig
ATTORNEY

Aug. 17, 1954 C. J. YOUNG 2,686,706

FACSIMILE RECORDER

Filed May 29, 1950 7 Sheets-Sheet 6

INVENTOR
Charles J. Young
BY
George T. Craig
ATTORNEY

Aug. 17, 1954 C. J. YOUNG 2,686,706

FACSIMILE RECORDER

Filed May 29, 1950 7 Sheets-Sheet 7

INVENTOR.
Charles J. Young
BY [signature]
ATTORNEY

Patented Aug. 17, 1954 2,686,706

UNITED STATES PATENT OFFICE 2,686,706

FACSIMILE RECORDER

Charles J. Young, Princeton, N. J., assignor to Radio Corporation of America, a corporation of Delaware Application May 29, 1950, Serial No. 165,049

10 Claims. (Cl. 346—101)

The present invention relates to facsimile recorders and more particularly, but not necessarily exclusively, to a facsimile recorder having novel recording elements cooperating in a novel manner with special drive and adjustment features.

In accordance with the invention, there is provided a drum having a single turn helix and a larger drum carrying a multi-turn helix. The intersection point which accomplishes marking is established between the helices of the two cooperating drums. The larger drum with the multi-turn helix runs at a higher speed than the drum having the single-turn helix.

The primary object of the present invention is to provide a facsimile recorder which will print spots of better definition, will have less stored energy in the rotating parts, and which will be compact.

Another object of the invention is to provide a novel driving connection for a helix carrying drum.

A further object of the invention is to provide a helix carrying drum which may be directly driven from a high speed motor without the need of interposing high quality and expensive gearing.

Other objects will be seen by reading this specification which refers to the drawings in which.

Figure 1:
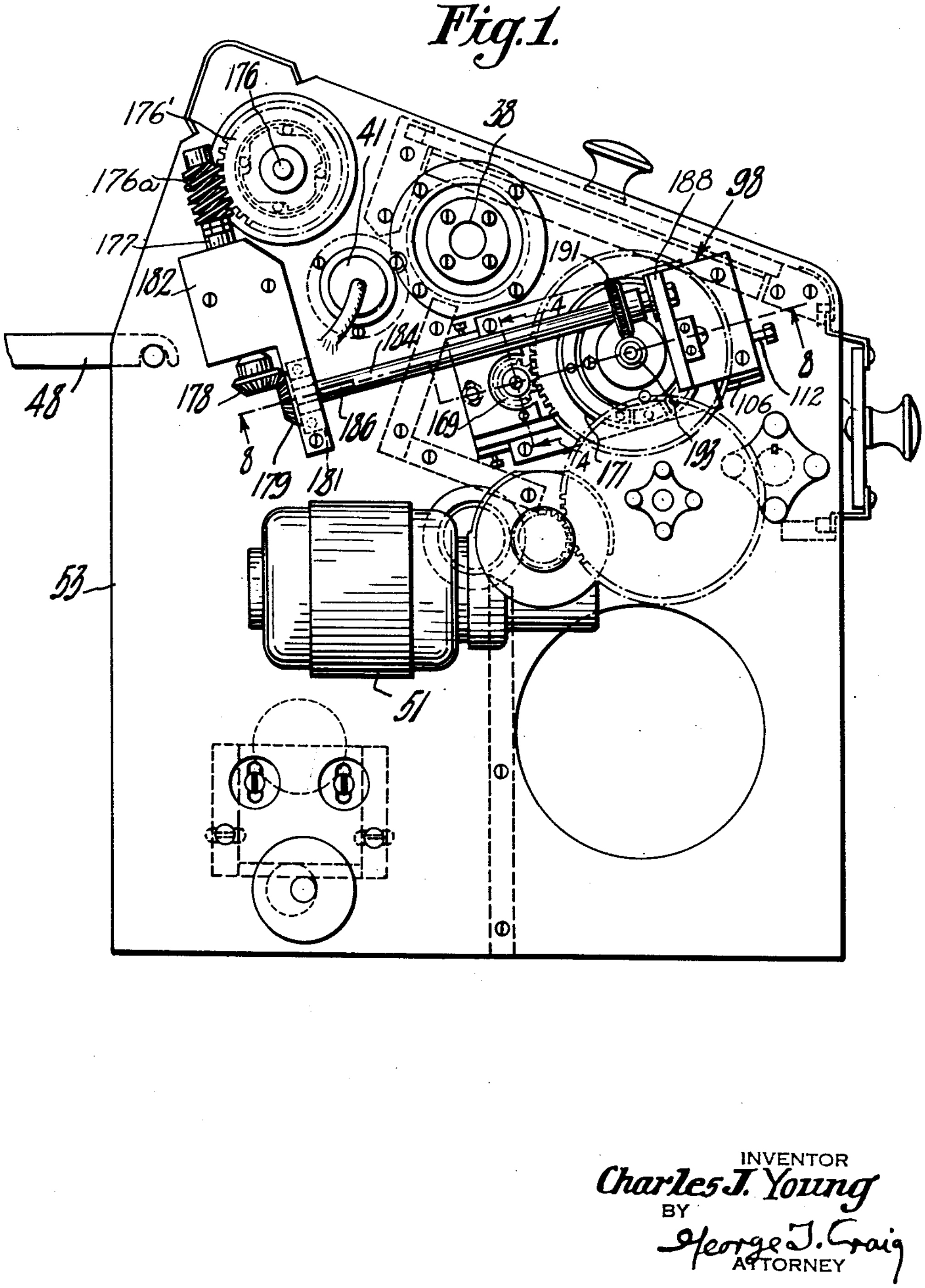
Figure 1 is a view in side elevation of a facsimile recorder embodying the invention.
Figure 2:
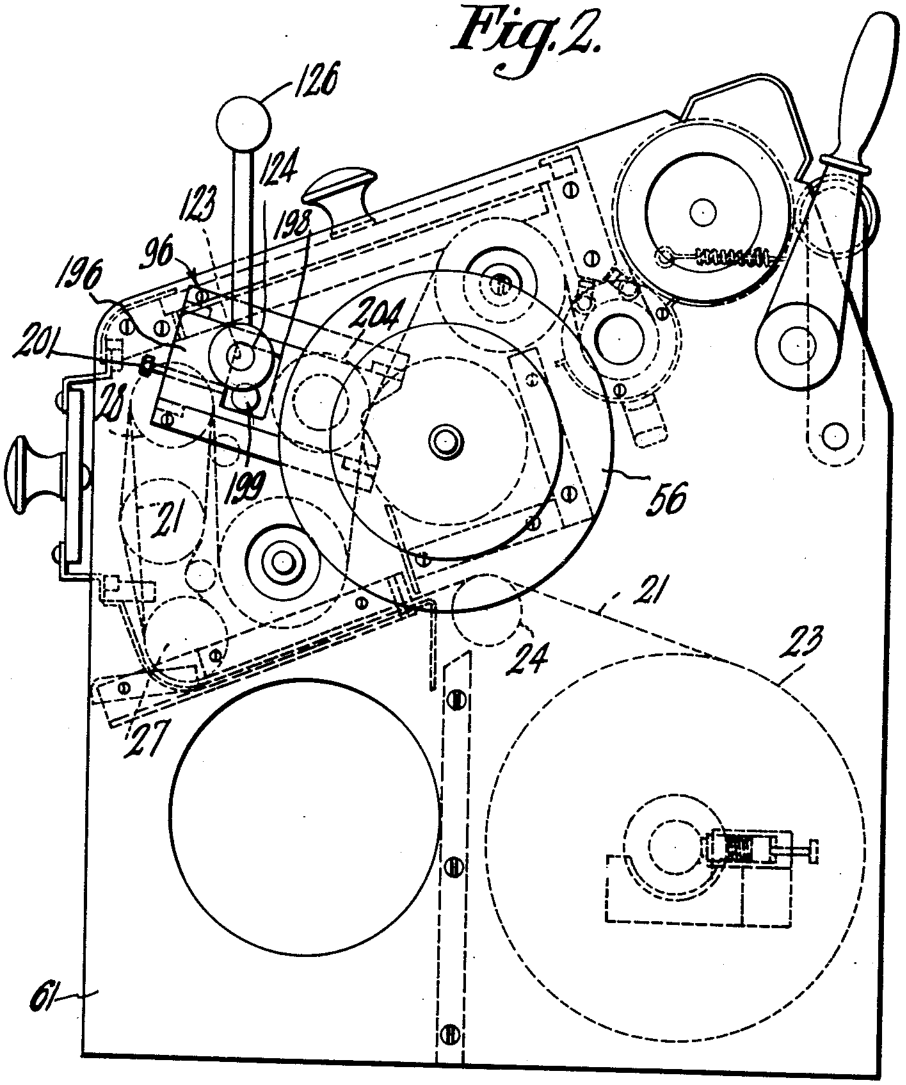
Figure 2 is an elevational view of the machine of Fig. 1 taken from the opposite end.
Figure 3:
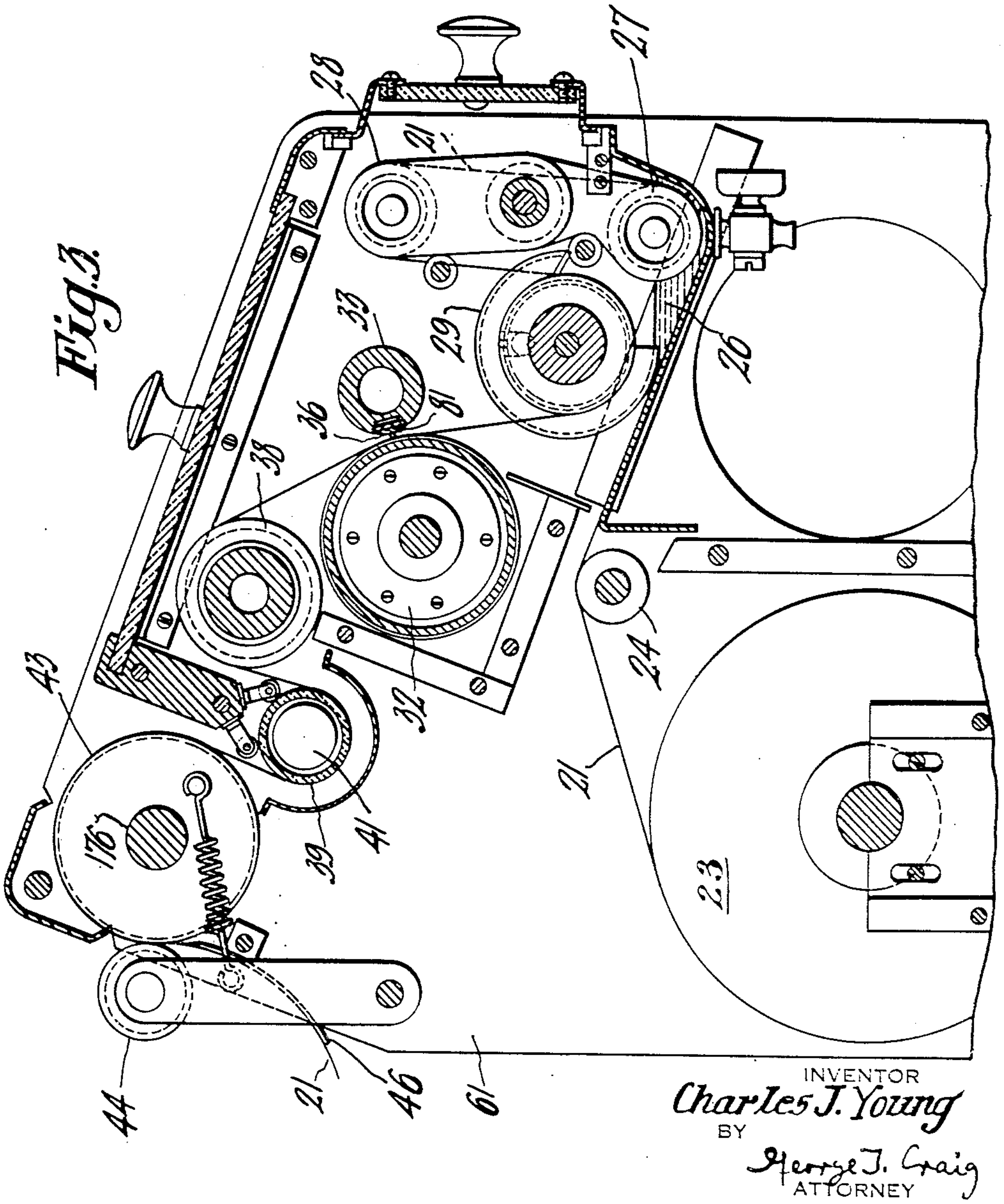
Figure 3 is a vertical section of the machine of Figure 1.

Wide page facsimile recording apparatus including the invention is shown generally in Figures 1 to 3 of the drawings. Recording paper 21 is drawn from a storage roll 23 and passes over an idler roller 24 into a liquid bath 26. From the liquid bath the paper 21 passes over the idler rollers 27 and 28 and around a secondary wetting roll 29. The roll 29 rotates oppositely to the direction of movement of the paper. The recording or printing mechanism, later to be described in detail, comprises a helix drum 32 and a drum 33 carrying a cooperating helical printer bar 36. Following recording effected in the region of the drums 32 and 33, the paper passes over an idler roller 38, around a glass tube 39, which encloses a fluorescent fixing lamp 41. From the glass tube 39, the paper passes around a feed roller 43, under the pressure idler 44, and out of the machine. When loading the paper, the holder for the liquid bath 26 is removed and the idlers 27 and 28 may be swung out to the front of the machine.

A paper guide 46 serves to deliver the emerging web onto an inspection desk 48. A separate motor 51 on the outside of the outside plate 53 drives the secondary wetting roll. Driving power for the recording apparatus, including the coordinated paper feed, is provided by a motor 56. The motor 56 is preferably of a constant speed type which may be synchronized with a more or less remote transmitter (not shown) which has suitable phase lock-in control means indicated as a magnetic brake 58. Synchronization may be obtained as shown in Artzt Patent No. 2,383,260 granted August 21, 1945.

Figures 8, 9:
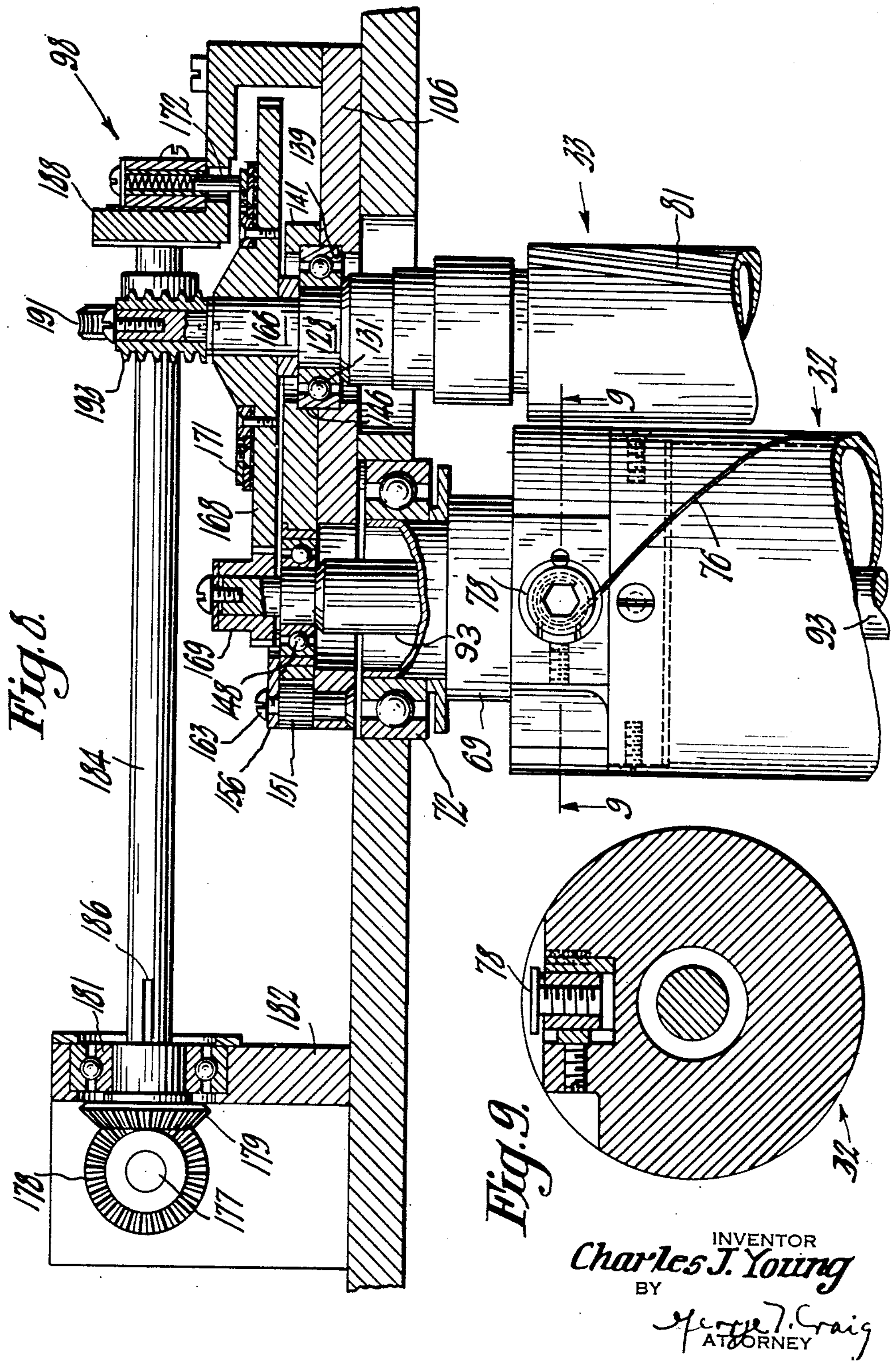
Figure 8 is a sectional view to an enlarged scale of a part of the mechanism shown in Fig. 1, the section being taken on line 8—8 of Fig. 1.
Figure 9 is a sectional view of the helix carrying drum, the section being taken on line 9—9 of Fig. 8
Figure 10:
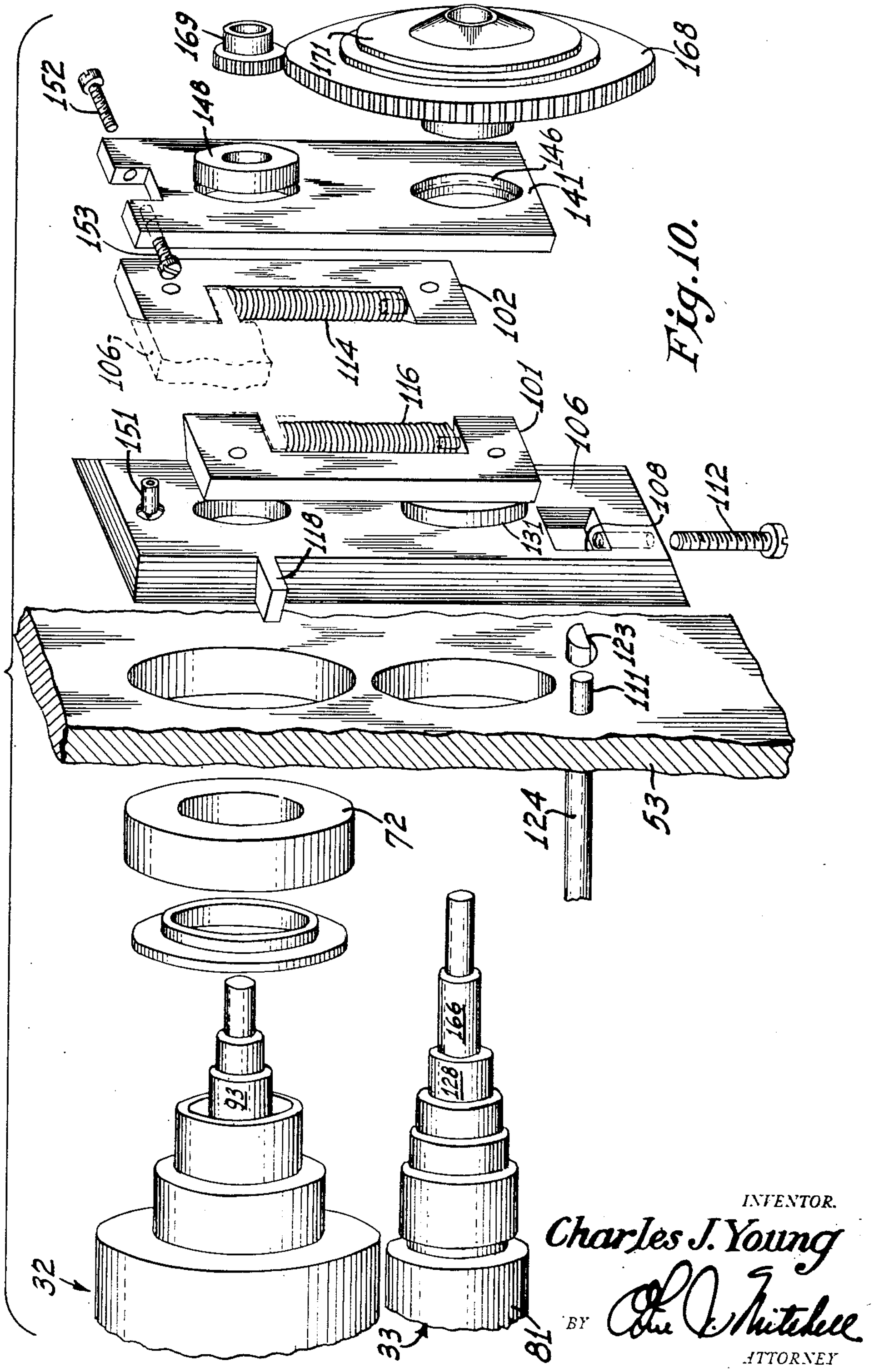
Figure 10 is an exploded isometric view showing in enlarged detail the mechanism shown in Figure 8.

The main motor 56 is suitably supported against the side plate 61 and the rotor shaft 63 projects into the machine and is directly connected to the drum helix 32. This is accomplished by fitting the circular end support 68 on the motor shaft. The other end support 69 is supported by a suitable bearing such as a ball bearing 72. A cylindrical shell 74 extends between the end supports 68 and 69 and has the helix wire 76 raised around it and anchored at both ends. One anchor comprising a bolt 78 appears in Figures 8 and 9 of the drawings. The helix wire 76, in the illustrative example, has five complete turns about the drum 32. From the supporting means for the helix drum, just described, it will be seen that the helix drum is securely positioned and is directly driven from the motor 56 without the need for intervening reduction gears. This latter feature is present because of the combination of the multiturn helix and the cooperating helical printer bar 81

Figure 7:
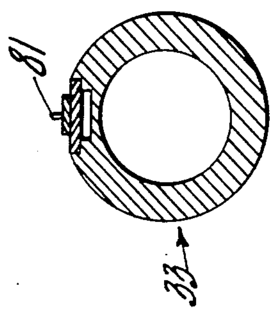
Figure 7 is a sectional view taken on line 7—7 of Fig. 6.

(Fig. 7). The printer bar drum 33 in accordance with the invention is made adjustable with respect to the helix drum 32. This is accomplished by gears having a fixed distance between centers. The meshed gears are moved together bodily and the axis of one is rotatable about the axis of the other to provide accurate phasing adjustments. This is accomplished in the illustrative example by providing a special driving connection between the drums which will now be described.

The end support 68 (Fig. 4) has a Sylphon member 84 secured to it by screws 88. The other end of the Sylphon member is connected to a collar 91 which is securely pinned to a shaft 93. A centering ball 94 keeps the end of the shaft 93 in proper relationship with respect to the motor shaft 63. The Sylphon and centering ball form a universal joint of great torsional stiffness, and having no angular distortion between driving and driven members.

Figures 4, 5:
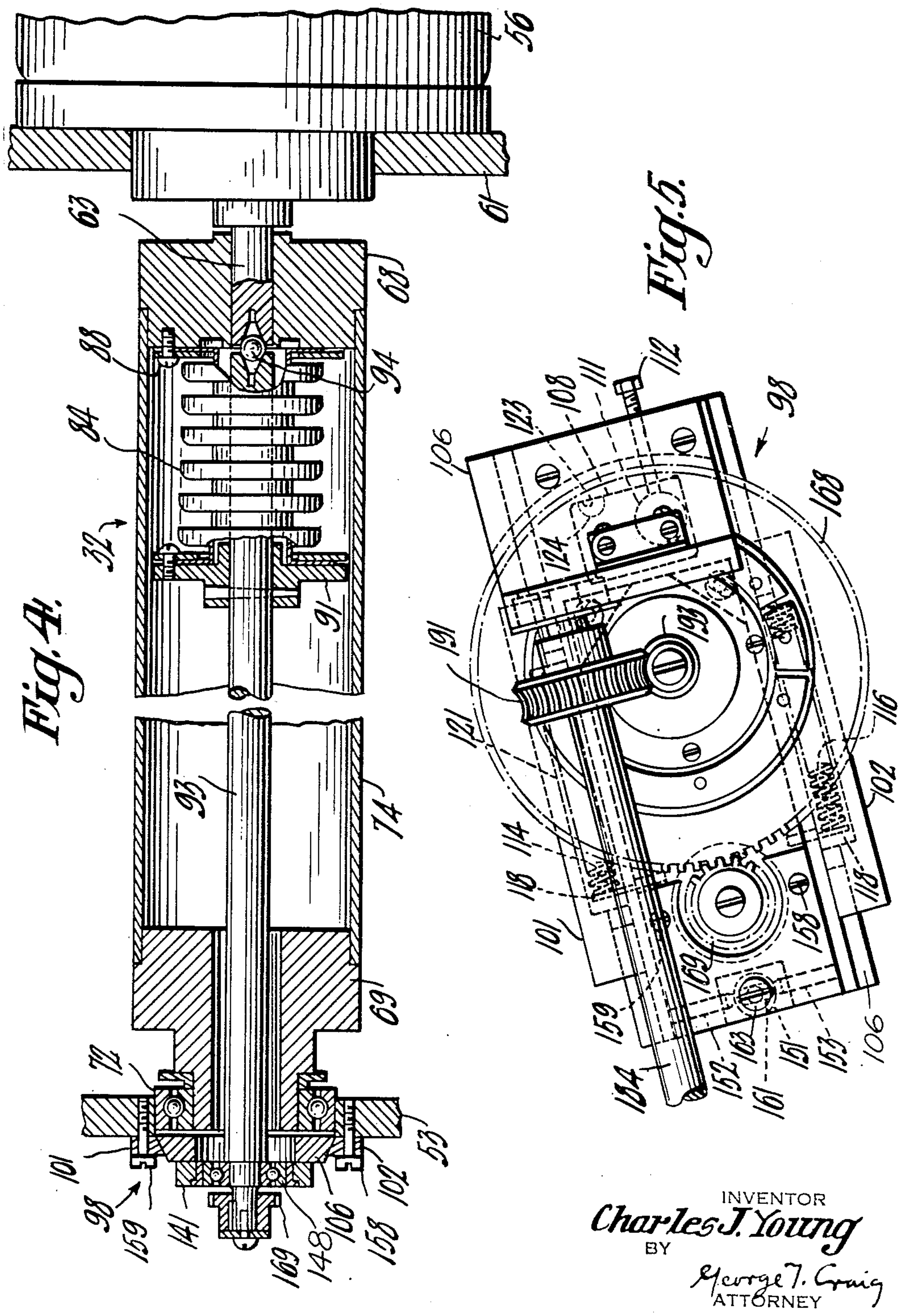
Figure 4 is a sectional view of the multi-turn helix carrying drum, the section being taken on line 4—4 of Fig. 1.
Figure 5 is a view drawn to an enlarged scale of parts of the mechanism shown in Fig. 1.
Figure 6:
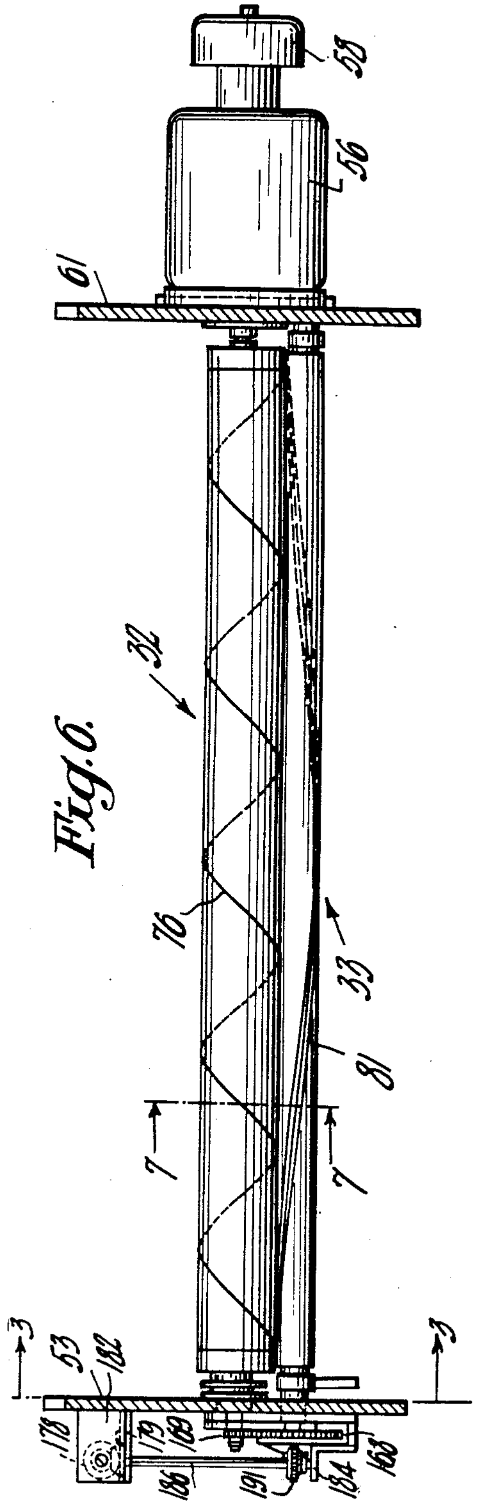
Figure 6 is a view partially in section showing the cooperating drums which provide the recording or printing couple.

Slide assemblies 96 and 98 are located on the side plates 61 and 53 respectively. The assembly 98 is shown in detail in Figures 4, 5, 8 and 10. It comprises two stationary guide members 101 and 102. A main bearing plate 106 is slidably held by the guide members 101 and 102. The main bearing plate has a rectangular opening or window 108 into which projects a boss 111 secured to the side plate 53. A bolt 112 threaded into the end of the plate projects into the window and contacts the boss 111 to fix the location of the plate 106. Springs 114 and 116 bias the plate to the left as shown on Fig. 5. Each spring engages a stud 118 in the plate 106. The other end of the spring is received against the end of a recess 121 of the stationary part 101 or 102. Fine adjustment of the position of the plate may be obtained by turning the screw 112. The plate 106 may be moved to the right as shown in Fig. 5 by means of a flat portion 123 of a shaft 124. A handle 126 (Fig. 2) operates the shaft so as to retract the plate of both assemblies 96 and 98 simultaneously without disturbing the fine adjustment.

The end 128 of the drum 33 is received in a bearing 131. The bearing 131 is seated in a recess 139 in the plate 106 and a portion thereof projects beyond the surface of the plate. A second plate 141 has a recess 146 which provides a pivot for the plate 141 so that it may have swinging movement about the axis of the drum 33. The projecting shaft 93 is received in a bearing 148 which is firmly seated in the plate 141. It will be seen that if the plate 141 swings about the axis of the drum 33 to provide phasing adjustment, the axial spacing between the shaft 93 and the drum 33 will be accurately maintained. A post 151 projects up from the plate 106 so as to be contacted by the ends of two tangent screws 152 and 153. Adjustment of these screws provides for fine adjustment of the angularity of the plate 141. A bearing cover plate 156 overlies the bearing 148. This is secured to the plate 141 by screws 158 and 159. An elongated aperture 161 receives the shank of a clamping screw 163 which has threaded engagement with the end of the post 151. The shaft extension 166 of the drum 33 carries the gear 168 which meshes with a pinion 169 secured on the end of the shaft 93. The gear ratio of this gear and pinion combination in the illustrative example is 5 to 1. Other gear ratios may be selected in accordance with the invention when different turns ratios between the helix 76 and the printer bar 81 are chosen. The gear 168 has a radial phasing commutator 171 mounted on its face. This commutator is contacted by a brush 172.

The previously mentioned feed roller 43 has a shaft 176 carrying a bevel gear 176'. A bevel gear 176a carried by shaft 177 meshes with the first bevel gear and shaft 177 is carried by a bracket 182. Secured to the other end of shaft 177 is a bevel gear 178 which meshes with a bevel gear 179. A shaft 184 having a spline or key 186 is axially slidable in the gear 179. This shaft is journaled for rotation in a bracket 188 secured to and movable axially with the plate 106. The shaft 184 also moves axially with the plate 106. A worm wheel 191 meshes with the worm 193 secured to the end of the shaft extension 166.

The previously mentioned slide assembly 96 shown in Fig. 2 of the drawing comprises a slidable plate 196. This plate is also provided with an opening or window 198 into which a boss 199 projects from the side plate 61. An adjusting screw 201 bears against the boss. It will be understood that the plate 196 is spring biased by springs (not shown) corresponding in function to the springs 114 and 116 appearing on Fig. 5 of the drawings. The slide 196 carries a bearing 204 for the printer bar drum 33. The previously mentioned flat on the shaft 124 retracts the slide 196 without interfering with the setting of the screw 201.

By this invention, and particularly the combination of a torsionally stiff but flexible coupling and means for moving the printer drum axis without disturbing pitch circle relationship of the driving gears, two important results are attained. First, adjustment of printing pressure, and, second, fine adjustment phase relationship between the two helices. Both results are realized with the least number of meshing gears without sacrifice of gearing precision relationships. The helical printer bar 36 is flexibly mounted and cooperates with the helix. It is seated on a flexible strip. This strip is seated on a strip which spans a groove. Helix drum diameter is reduced by the combination of the helical printer bar and helical electrode.

What is claimed is:

1. A recorder for facsimile signals comprising a pair of helical electrodes, one of said electrodes having a different number of turns and being of different diameter from the other, means to support and drive said helices for rotation about parallel axes, means for applying a signal to said electrodes, and means for feeding a record receiving sheet between said electrodes.

2. A recorder for facsimile signals comprising a pair of helical electrodes, said electrodes being of different diameters, the electrode of smaller diameter having a less number of turns than the electrode of larger diameter, means to support said helices for rotation about parallel axes, means for applying a signal to said electrodes, and means for feeding a record receiving sheet between said electrodes.

3. A recorder for facsimile signals comprising a pair of helical electrodes, said electrodes being of different diameters, the electrode of smaller diameter having a less number of turns than the electrode of larger diameter, means to support said helices for rotation about parallel axes, means for applying a signal to said electrodes, means for feeding a record receiving sheet between said electrodes, and means for causing said electrode of larger diameter to rotate at a faster speed than the electrode of smaller diameter, the ratio of speeds being the same as the ratio of helix turns.

4. A recorder for facsimile signals comprising a pair of helical electrodes, said electrodes being of different diameters, the electrode of smaller diameter having a single turn, the electrode of larger diameter having a plurality of turns, means to support said helices for rotation about parallel axes, means for applying a signal to said electrodes, means for causing said electrode of larger diameter to rotate at a plurality of times the rotational speed of the electrode of smaller diameter, said electrodes turning in opposite directions, and means for feeding a record receiving sheet between said electrodes in the direction of travel of the electrodes at the sheet surface.

5. A recorder for facsimile signals comprising a pair of helical electrodes, one of said electodes having a different number of turns and being of different diameter from the other, means to support and drive said helices for rotation about parallel axes, means for applying a signal to said electrodes, means for feeding a record receiving sheet between said electrodes, and means including a flexible coupling in the supporting means of one of said helices for adjusting the distance between said axes while maintaining the relationship of the driving connections therebetween.

6. The recorder of claim 5 wherein means including said drive means are provided for altering the phase relationship between the helices.

7. A recorder for facsimile signals comprising a pair of helical electrodes, said electrodes being of different diameters, the electrode of smaller diameter having a less number of turns than the electrode of larger diameter, means including a flexible shaft within one of said helices to support said helices for rotation about parallel axes, means to drive directly one of said helices at scanning speed, gear means drivingly connected to said directly driven helix to drive the other helix at a reduced speed from said first helix, means including said flexible shaft to adjust the distance between said parallel axes while maintaining a fixed relationship between said gear means and said first named driving means, means for applying a signal to said electrodes, and means for feeding a record receiving sheet between said electrodes.

8. A facsimile scanner which comprises: a first helix drum; a second helix drum; a motor shaft connected directly to one end of said first drum, the other end of said first drum being carried by relatively fixed bearing; a second shaft within said first helix drum; a flexible driving connection between said first drum and one end of said second shaft; a bearing slide; a bearing for said second drum carried by said bearing slide; a gear mounted on the end of said second drum; a gear connected to the other end of said second shaft and in mesh with said first gear; a bearing carrying plate pivotally mounted on said bearing slide, said pivot being concentric with said bearing for said second drum; and a bearing for said gear end of said second shaft on said bearing carrying plate, whereby said bearing plate is adapted to swing about its pivot to adjust the phase relationship between said drums, said gears being adapted to remain in mesh during such swinging movement of said plate.

9. A facsimile scanner which comprises: a first helix drum; a second helix drum substantially parallel to said first helix drum; a motor shaft connected directly to one end of said first drum, the other end of said first drum being carried by a relatively fixed bearing; a second shaft associated with said first drum, one end of said second shaft being drivingly connected to said motor shaft such that said second shaft is permitted angular displacement with respect to said motor shaft; a bearing slide; a bearing for said second drum carried by said bearing slide; a bearing for said first helix drum carried by said bearing slide; the other end of said second shaft being drivingly connected to said second drum; and means to move said bearing slide to adjust the radial displacement between said helix drums, whereby said driving connection between said second shaft and said second drum is retained.

10. In a facsimile scanner, a helix drum, a drum having a helical printer bar thereon, a motor shaft, one end of said helix drum being directly connected to said motor shaft, the opposite end of said helix drum being carried by a relatively fixed bearing, a shaft within said helix drum, a ball pivot for said shaft on said motor shaft, a Sylphon bellows serving as a flexible drive from said helix drum to said second named shaft, a bearing slide, a bearing for said printer bar drum carried by said bearing slide, a bearing carrying plate pivoted on said bearing slide, said pivot being concentric with said printer bar drum bearing, a bearing for said second named shaft carried by said bearing carrying plate, means to move said bearing slide to adjust the position of said printer bar drum with respect to said helix drum, means to swing said bearing plate about its pivotal center thereby to adjust the phase relationship between said drums, a gear connected to said printer drum and a pinion on said second named shaft, said gear and pinion being in mesh, a second bearing slide opposite said first named slide, a bearing for said printer bar drum on said second named bearing slide, and means for simultaneously moving said slides.

References Cited in the file of this patent

UNITED STATES PATENTS

| Number | Name | Date |
|---|---|---|
| 2,368,739 | Blain | Feb. 6, 1945 |
| 2,391,768 | Blain | Dec. 25, 1945 |